United States Patent [19]

Hattan

[11] Patent Number: 4,543,945
[45] Date of Patent: Oct. 1, 1985

[54] STRUCTURE AND MANUFACTURE OF RADIATION COLLECTORS

[75] Inventor: Mark Hattan, Orange, Calif.

[73] Assignee: William P. Green, Pasadena, Calif.; a part interest

[21] Appl. No.: 577,606

[22] Filed: Feb. 6, 1984

[51] Int. Cl.$^4$ .................................................. F24J 3/02
[52] U.S. Cl. ........................................ 126/438; 126/426; 126/450; 350/631; 350/634
[58] Field of Search ............... 126/438, 439, 426, 450, 126/417; 350/288, 289

[56] References Cited

U.S. PATENT DOCUMENTS

| 3,364,676 | 1/1968 | Miller | 126/438 X |
| 4,002,158 | 1/1977 | Radebold | 126/438 |
| 4,318,394 | 3/1982 | Alexander | 126/438 |
| 4,333,448 | 6/1982 | Johnson | 126/448 X |
| 4,432,342 | 2/1984 | Lucas et al. | 126/426 X |

FOREIGN PATENT DOCUMENTS 2362347  3/1978  France .

Primary Examiner—Larry Jones
Attorney, Agent, or Firm—William P. Green

[57] ABSTRACT

A radiation collector having a flexible reflective wall which is deflected to a curved preferably paraboloidal configuration by application of differential pressures to opposites sides of the wall. In one form of the invention, the reflective wall forms the back wall of an inflatable bag having a forward flexible wall through which radiation from a source passes to the interior of the bag for reflection by the rear wall toward an axis of the device. In another form of the invention, the reflective flexible wall is the front wall of a vacuum chamber and is deflected rearwardly by the differential between a subatmospheric pressure in the chamber and atmospheric chamber at the front of the wall. A structure extending essentially circularly along the periphery of the flexible reflective wall preferably restrains the peripheral position of the wall against constriction radially inwardly upon application of the pressure differential to the wall, in a relation causing the wall to assume an ultimate configuration corresponding more closely to that or a true paraboloid than if the restraining structure were not present. Desirably, the pressure differential is predetermined and regulated to give the reflective wall a substantially exactly paraboloidal shape.

25 Claims, 13 Drawing Figures

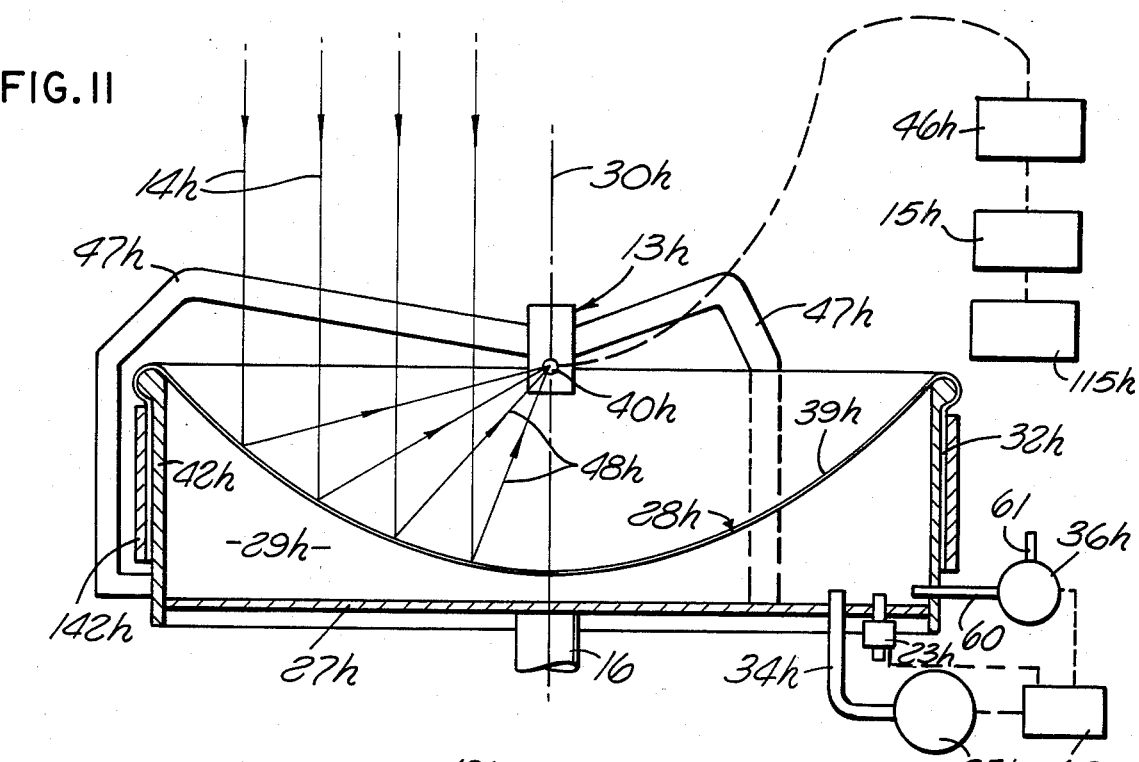
FIG. 11
FIG. 12
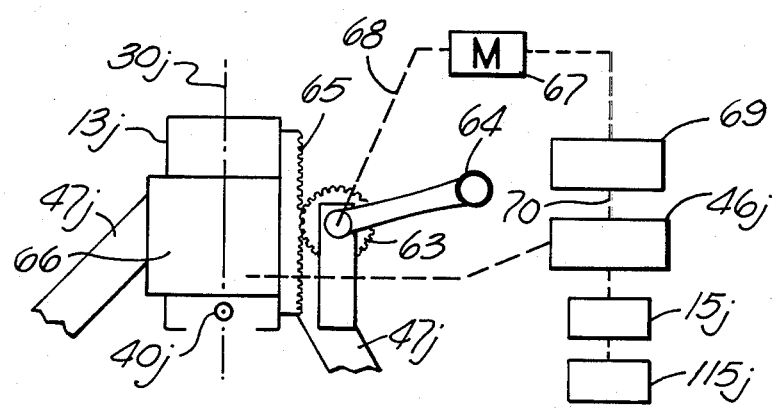
FIG. 13

STRUCTURE AND MANUFACTURE OF RADIATION COLLECTORS

BACKGROUND OF THE INVENTION

This invention relates to radiation collectors for receiving and concentrating electromagnetic radiation of a desired frequency, such as solar radiation, microwave television broadcast signals, radio frequency signals, or the like.

In my copending U.S. patent application Ser. No. 211,514 filed Dec. 1, 1980 on "Radiation Collectors", I have disclosed a type of radiation collector which includes an inflatable bag having a flexible front wall through which radiation from a source can pass to the interior of the bag, and having a flexible rear wall with a reflective surface acting to reflect the radiation in concentrated form toward the axis of the collector. An absorber or collector unit may then be positioned at the axis to receive and respond to that radiation.

SUMMARY OF THE INVENTION

The present invention provides certain improvements in radiation collectors which may be similar in some respects to the devices of the above identified application, and which in particular utilize a flexible reflective wall for concentrating the received radiation. A purpose of the invention is to provide structures and methods for enabling such a flexible reflective wall to automatically assume a shape capable of concentrating the collected radiation very effectively and reliably at essentially a single focal point, to thereby assume optimum response of the device to the radiation.

In order to achieve this improved focusing of the reflected radiation, the apparatus preferably includes a structure which extends essentially circularly along the periphery of the flexible reflective wall of the device, and which is connected to or otherwise acts against that wall in a manner restraining its periphery against constriction radially inwardly to a reduced diameter when the wall is deformed to its curved active shape by application of different pressures to its opposties sides. In the absence of this restaining structure, the wall tends to assume a generally spherical curvature which distributes the reflected radiation along an axis of the sphere rather than at a point. When the periphery of the wall is restrained against inward constriction as discussed, the wall as it deforms may assume a shape more closely approximating that of a paraboloid, to concentrate most or all of the reflected radiation at the focus of the paraboloid. If the reflective wall is a back wall of an inflatable bag as disclosed in my above identified copending application, the structure which restrains inward constriction of the reflective wall may also restrain inward constriction of the front radiation passing wall of the bag.

Certain other features of the invention relate to the provision of an arrangement in which a flexible reflective wall is the front wall of a vacuum chamber, rather than the rear wall of an inflatable bag. This front wall is then deflectable rearwardly toward the interior of the vacuum chamber by the pressure differential between a sub-atmospheric pressure maintained within the chamber and atmospheric pressure acting against the front of the wall. The reflective wall may be restrained against inward constriction by a structure or hoop extending along the periphery of the wall. The back of the vacuum chamber may be formed either by a rigid structure or by another flexible wall exposed to the pressure differential and deformable thereby.

In either type of device, I may provide means for regulating the pressure acting against the deformable wall in order to continously maintain an optimum preferably paraboloidal configuration of the reflective wall, or may provide apparatus for automatically shifting the position of a unit which responds to the reflected radiation to produce an optimum output.

BRIEF DESCRIPTION OF THE DRAWINGS

The above and other features and objects of the invention will be better understood from the following detailed description of the typical embodiments illustrated in the accompanying drawings, in which:

FIGS. 11 and 12 are axial sectional views representing two variational arrangements containing vacuum chambers; and FIG. 13 illustrates fragmentarily a variation of the FIG. 1 arrangement in which the feed horn is adjustable along the axis of the parabolic reflector wall.

DESCRIPTION OF THE PREFERRED EMBODIMENTS

Figure 1:
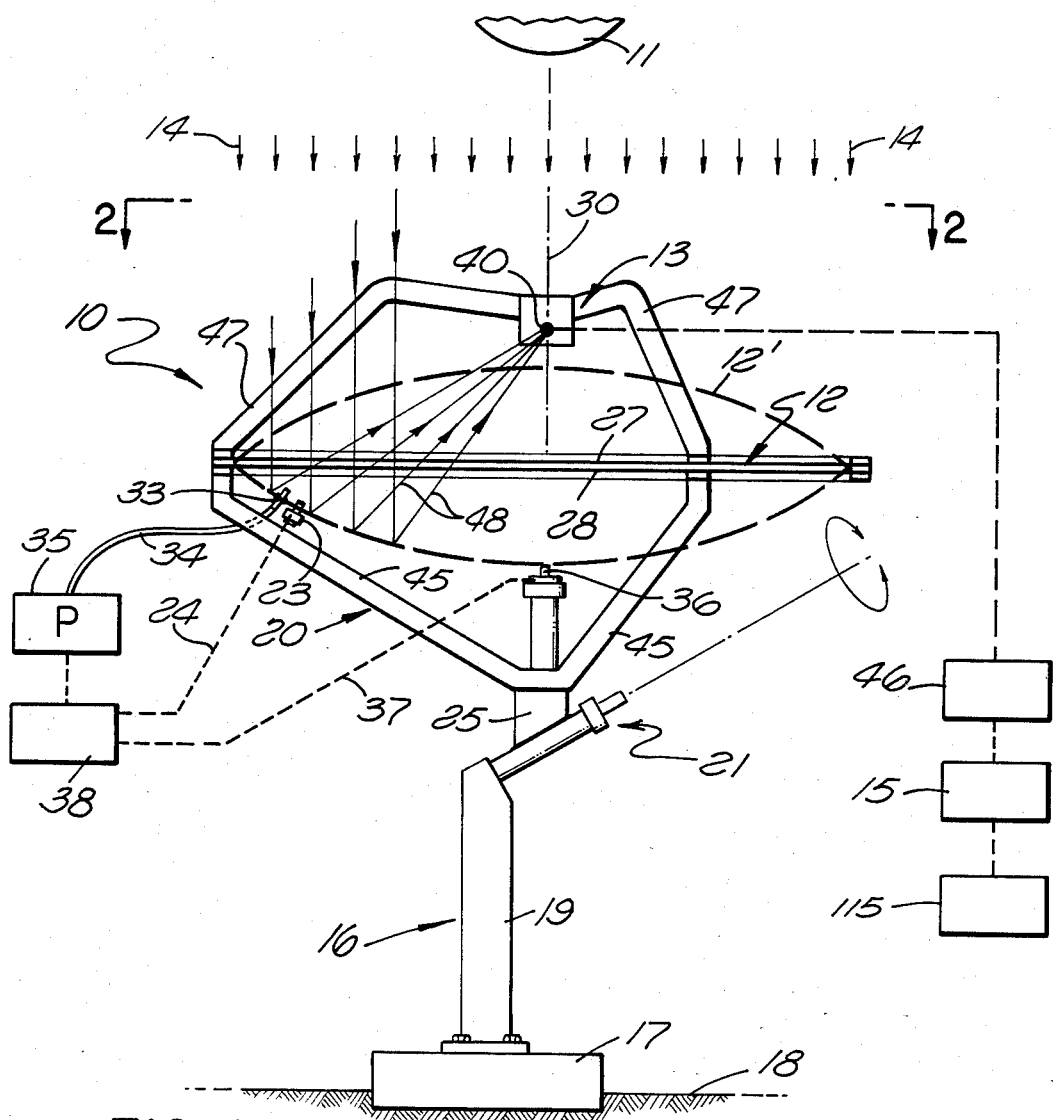
FIG. 1 is a vertical sectional representation of a radiation collector constructed in accordance with the invention.

In FIG. 1, there is illustrated at 10 a radiation collector which is constructed in accordance with the invention, and which acts to collect and utilize or respond to radiation from a distant source represented diagrammatically at 11. The radiation is reflected and concentrated by an inflatable bag 12 which is represented in full lines in its non-inflated condition in FIG. 1, and is represented in broken lines at 12' as it appears when fully inflated and in use for collecting and reflecting the radiation. This inflatable bag 12 concentrates the reflected energy at the location of a unit or element 13 designed to receive and respond to the particular type of radiant energy being collected. It is assumed that the source 11 is far enough away that the rays of energy represented by the arrows 14 in FIG. 1 are all parallel or substantially parallel as they approach the collector.

If the purpose of the device is to collect solar energy, the source represented at 11 is of course the sun, and the unit 13 is an appropriate heat absorber such as a boiler through which water may be passed for elevation in temperature by the concentrated solar energy. Source 11 may also be any other type of electromagnetic radiation source, such as for example a geo-stationary satellite emitting television signals toward the earth, in which event the collector 10 fucntions as an antenna dish for receiving the signals and processing them before delivery to a television receiver 115. The remainder of this description will assume application of the invention to that use.

Figure 2:
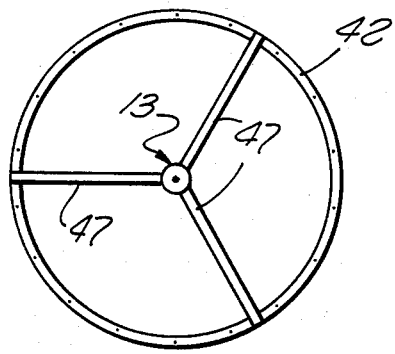
FIG. 2 is a reduced plan view on line 2—2 of FIG. 1.
Figure 3:
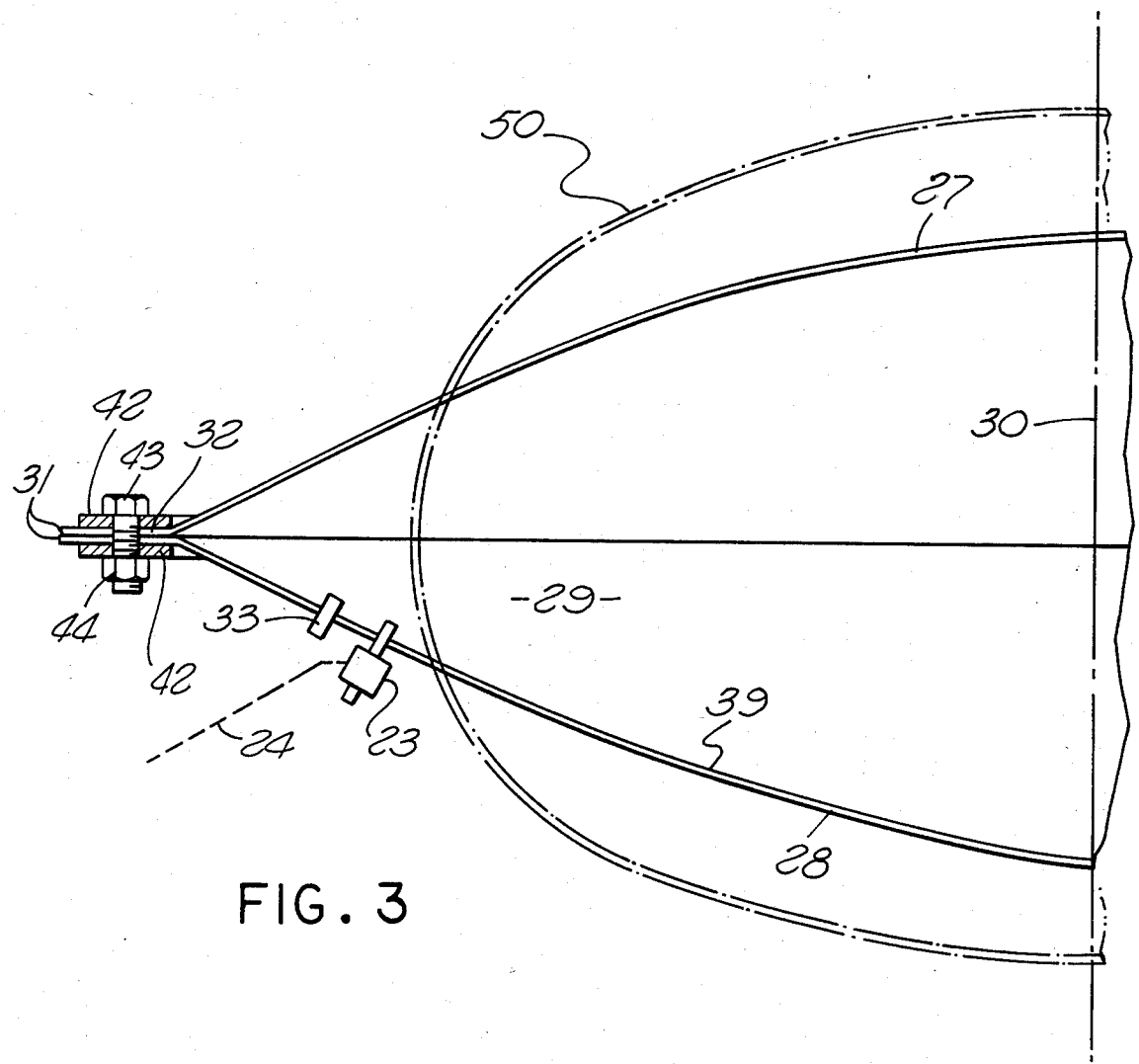
FIG. 3 is an enlarged vertical axial section through the inflatable bag of the FIG. 1 radiation collector device, shown in its operative inflated condition.

The inflatable bag 12 of FIGS. 1 through 3 may be supported by a stand 16 having a base portion 17 resting on a horizontal support surface 18 such as the ground, a cement slab, or the like. Projecting upwardly from base 17, the stand may include a column 19 to which an upper portion 20 of the device may be mounted by an adjustable connection 21 such as a conventional equatorial mount or altitude - azimuth mount.

The inflatable bag 12 may be formed of two upper and lower initially flat or planar walls 27 and 28 of flexible resinous plastic sheet material. Upon inflation of this bag, the upper and lower walls 27 and 28 can stretch sufficiently to assume the non-planar curved condition represented in broken lines at 12' in FIG. 1. Walls 27 and 28 are circular about an axis 30 which in use is directed toward the satellite 11 from which signals are to be received. In FIG. 3, the peripheral circular edges of the two flexible top and bottom walls 27 and 28 are shown at 31. The annular peripheral portions 32 of these walls or sheets 27 and 28 may be heat sealed, ultrasonically welded, or otherwise bonded together in superimposed relation and continuously along the entire annular extent of those edges, to form an effective circular seal closing the periphery of the bag. The plastic material of which walls 27 and 28 are made is impermeable to air, so that upon inflation of the bag with air to the condition represented in broken lines at 12' in FIG. 1 and in full lines in FIG. 3, the contained pressurized air is confined within the inflated bag to maintain unit 12 continously in its inflated condition. Air may be filled into the bag through a check valve 33 of the tire inflation type, with the air being delivered to that valve through a line 34 from a compressor or pump 35. Air may be controllably exhausted from the bag through an electrically operated discharge valve 23, typically of the solenoid type, which may be opened and closed by electrical signals received through a two conductor cable 24. A sensor 36 is in a position to be engaged by the center of the lower wall 28 when it reaches a desired fully inflated condition, and when thus contacted sends a signal through electrical line 37 to an automatic control 38, which responds to actuation of the sensor to automatically energize pump 35 and discharge valve 23 to supply air to or discharge it from the bag, as necessary to continuously maintain the inflation of the unit 12 at the condition in which its lower wall 28 just contacts and actuates sensor 36. This sensor may for example be an electrical switch actuable by engagement with bottom wall 28, and may be carried by and project upwardly above the element 25 of the upper structure 20 of the collector.

Upper wall 27 of the inflatable unit 12 is transparent to the microwave raidation emitted by satellite 11, to pass that radiation through upper wall 27 to the interior of the inflated unit. Bottom wall 28 has an upwardly facing surface 39 which is specularly reflective with respect to the radiation from source 11, and which reflects that radiation back upwardly toward a focus point 40 at which the unit 13 for receiving the radiation is located. In the optimum fully inflated condition of unit 12 as represented in FIG. 3, the flexible bottom wall 28 of the unit and its reflective surface 39 are shaped to follow the curvature of a paraboloid centered about axis 30 and having its focus at the location 40 on that axis.

It is contemplated that flexible walls 27 and 28 may be formed of any appropriate material having the desired flexibility and other characteristics. For example, these plastic sheets may be formed of polyvinyl choloride, or a polyester such as that sold by E. I. DuPont de Nemours as "Mylar", or polyvinyl fluoride. The reflective surface 39 may be formed in any convenient manner, as by vacuum or other deposition of aluminum or other specularly reflective material on eitherthe upper or lower surface of bottom wall 28 of the inflatable unit, or by incorporation of particles of metal or other reflective material in the plastic sheet, or by forming bottom wall 28 of two or more laminations of appropriately flexible and somewhat stretchable material adhered together with one of those laminated sheets carrying a layer of reflective material.

The annular peripheral portions 32 of the flexible upper and lower sheets 27 and 28 are retained against constriction radially inwardly toward axis 30 upon inflation of the unit 12 by provision of an annular rigid structure connected to those peripheral portions. In the form of the invention illustrated in FIGS. 1 through 3, this annular rigid structure takes the form of two identical circular clamping rings or hoops 42, typically made of an appropriate metal, with these two rings 42 being received at the upper and lower sides of annular portions 32 of the flexible sheets and being clamped tightly thereagainst by a series of circularly spaced screws 43 passing through registering openings in the two rings 42 and in portions 32 and carrying nuts 44 which act when tightened to clamp portions 32 between rings 42 in fixed condition and at a fixed diameter. The circular rings 42 are centered about the main axis 30 of unit 12.

Rings 42 form a portion of the previously referred to upper structure 20, and may be rigidly connected to support element 25 by a tripod arrangement including three circularly spaced rigid rods 45 welded or otherwise secured at first ends to element 25 and at second ends to the lower one of the rings 42. Thus, rods 45 act to maintain rings 42 and the carried flexible walls 27 and 28 in their proper positions with respect to axis 30 of the device.

The unit 13 for receiving radiation concentrated by reflection of the lower flexible wall 28 may be a conventional microwave feedhorn, which receives and collects the radiation and delivers it to a low noise amplifier (LNA) represented diagrammatically at 46 in FIG. 1, with that amplifier in turn delivering the amplified signals through processing circuits 15 to a television receiver 115. Feedhorn 13 is mounted in fixed position relative to rings 42 and the parts connected thereto by any suitable support structure, typically represented as a tripod arrangement including three mounting rods 47 welded or otherwise rigidly connected at opposite ends to feedhorn 13 and the upper one of the rings 42. The feed horn is located at the focus 40 of the paraboloid defined by reflective bottom wall 28 when in the fully inflated condition in which it is automatically maintained as discussed above.

In placing the device of FIGS. 1 through 3 in use, its adjustable connection 25 is first set to a postiion in which the axis 30 of the collector is aimed toward and extends through the particular satellite 11 from which microwave television transmissions are to be received. Either prior to or after such positioning of the different portions of collector 10, pump 35 is placed in operation to deliver air under pressure to the interior of chamber 29 between upper and lower flexible walls 27 and 28. As the pump operates, the air between walls 27 and 28 inflates the unit 12, forcing wall 27 upwardly and wall 28 downwardly and toward the broken line positions represented at 12' in FIG. 1. When these walls reach the broken line positions of FIG. 1, each of the walls is shaped to have the configuration of a paraboloid whose axis is the previously identified axis 30 along which radiation approaches the collector. The two paraboloids of the upper and lower walls in the fully inflated condition may typically be identical, as shown, though in some instances the upper wall 27 may be configured and designed to assume a shape other than that of a paraboloid. The radiation passing along the parallel paths 14 from source 11 to collector 10 first passes through the upper transparent wall 27 of the inflatable unit 12, which wall is of a material capable of passing that radiation with little or no loss and substantially no refraction or reflection. The radiation continues downwardly along these parallel paths to the reflective bottom wall, which by virtue of its paraboloidal configuration reflects all of the radiation toward focus 40 of the paraboloid, as indicated by the lines 48 of FIG. 1, to thereby deliver all of the concentrated energy to feedhorn 13, which delivers the received signal to low noise amplifier 46, which in turn delivers a signal to circuit 15 and television receiver 115 to produce a picture and sound corresponding to that broadcast by satellite 11.

As previously indicated, sensor 36 controls the extent to which the flexible sheet of resinous plastic material forming bottom wall 28 of the inflatable chamber is deflected, by automatically halting the introduction of additional compressed air into chamber 29 when the central portion of bottom wall 28 reaches a point of contact with sensor 36, and thereafter regulating the delivery of air into or out of the bag as necessary to compensate for any leakage or change in temperature or pressure conditions. When the lower wall 28 is in its automatically maintained condition, this wall has a precisely paraboloidal shape with its focus at the point 40 at which unit 13 is located. Of particular importance to the invention is the fact that the rings or hoops 42 which are connected to the peripheral portions of the top and bottom walls 27 and 28 prevent those peripheral portions from moving radially inwardly toward axis 30 as unit 12 is inflated. It is this effect attained by the provision of the rings 42 which enables the bottom wall 28, and typically also the upper wall 27, to attain a precisely paraboloidal shape when inflated without the necessity for any other elements contacting the flexible walls and determining their configuration.

Three paramaters may be varied to attain an overall structure in which such a paraboloidal shape can be achieved by mere inflation of the unit 12. These three paramaters are:
1. The diameter of the rigid rings 42.
2. The characteristics of the material of which walls 27 and 28 (especially the latter) are formed, including specifically the elongation of the type of plastic utilized (percent elongation), the thickness of the plastic, and any reinforcement which may be contained in the sheet material for reducing its elongation (as by incorporation of fiberglass or other material in one or more of the layers 27 or 28).
3. The internal pressure to which unit 12 is inflated, or more precisely the differential between that internal pressure and the external atmospheric or ambient pressure.

These three parameters are varied in a particular installation to achieve the desired result of assuring paraboloidal configuration of the flexible reflecting bottom wall 28 when that wall reaches a position of contact with sensor 36. Optimally, the flexible walls and other elements are so designed and related that the reflective wall as the bag is inflated goes through an infinite number of different precisely paraboloidal shapes having different curvatures and different focii, ultimately reaching the curvature represented in broken lines in FIG. 1 with the focus of the paraboloid at 40 as discussed.

The broken line 50 of FIG. 3 represents the shape to which the two flexible walls 27 and 28 would expand if unit 12 were inflated without provision of rigid rings 42, that is, with the peripheral portions 32 of walls 27 and 28 sealed annularly together in the same manner as in FIGS. 1 and 3 but without restraining those peripheral portions against constriction radially inwardly toward axis 30 as the unit 12 is inflated. When such a structure is inflated, the peripheral portions of walls 27 and 28 move radially inwardly through a substantial distance as the upper wall 27 is stretched upwardly and wall 28 is stretched downwardly. The result is that the final shape of the inflated structure is far from that of a paraboloid, as represented in the broken line condition 50 of FIG. 3. In a structure having this configuraion, the reflective bottom wall 28 can not reflect all of the radiation to the focus 40 of the paraboloid of FIG. 1, but rather scatters the radiation to different locations along axis 30. Such distribution of the radiation along the axis is acceptable for some purposes, as for instance in a solar radiation concentrator, but is not acceptable for optimum functioning of an antenna for receiving satellite television transmissions.

Figures 4, 5, 6:
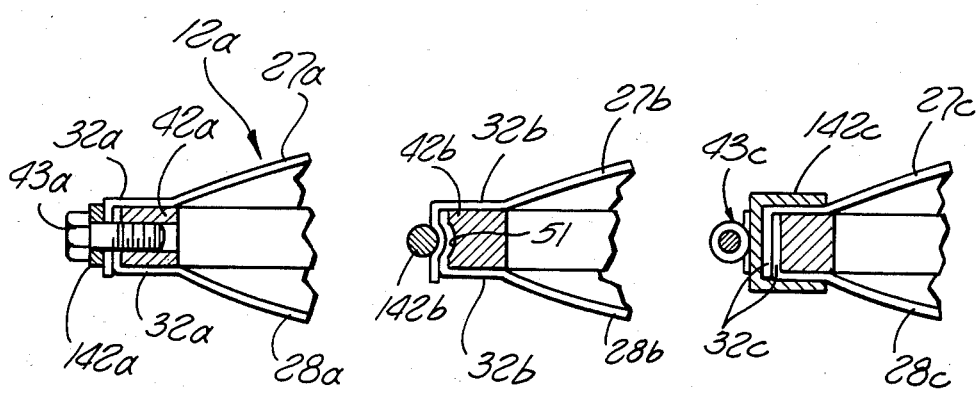
FIGS. 4 through 8 are fragmentary axial sections through variational arrangements for restraining the periphery of an inflatable bag type radiation collector against radially inward constriction.

FIG. 4 represents a variational arrangement which may be considered as identical to that of FIGS. 1 to 3 except for the provision of a different type of rigid hoop structure for maintaining the peripheral portions of the two upper and lower flexible walls 27a and 28a (corresponding to walls 27 and 28 of FIGS. 1 through 3) against radially inward constriction upon inflation of the unit 12a. In FIG. 4, a hoop 42a which may be formed from square metal rod material, is shaped to extend circularly about an axis such as axis 30 of FIG. 1, with the ends of the circular rod being welded or otherwise rigidly secured together, after which the peripheral portions 32a of flexible walls 27a and 28a are extended partially about hoop 42a in overlapping fashion as illustrated in FIG. 4, and a metal strap 142a is then positioned about the outside of the peripheral portions of the flexible sheets and tightened thereagainst by a series of circularly spaced screws 43a extending through strap or band 142a and the flexible material and connected threadedly into hoop 42a. As will be understood, the cross section represented in FIG. 4 is the same entirely about the circular extent of the periphery of the flexible walls and hoop 42a, to form an effective annular seal between the upper and lower walls without the necessity for heat sealing or otherwise bonding them together.

FIG. 5 shows another similar arrangement which may be essentially the same as that of FIG. 4, except that the overlapping peripheral portions 32b of flexible top and bottom walls 27b and 28b are clamped inwardly against annular rigid hoop 42b by a circular wire band 142b under tension. The radially outer surface of hoop 42b may contain an annular recess 51 into which the peripheral portions of the flexible sheets may be forced by wire 142b, to again form a seal without the necessity for bonding the sheets together.

The variational arrangement illustrated in FIG. 6 is similar to that of FIG. 4, but with provision of an essentially annular metal channel 142c extending about the radially outer sideand opposite axial sides of the overlapped peripheral edge portions 32c of the two flexible Walls 27c and 28c, and with a worm and worm gear type tightening mechanism 43c being connected to the opposite ends of channel 142c to tighten them circularly together in the manner of a conventional hose clamp and thereby tighten the channel 142c radially inwardly against the overlapped edges of the flexible material forming an effective annular air tight seal between them without the necessity for bonding the flexible layers together.

Figure 7:
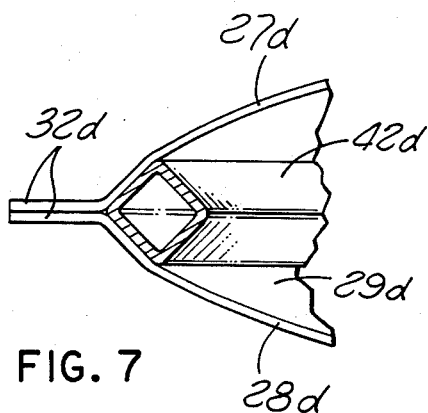

In the arrangement of FIG. 7, the peripheral portions 32d of the two flexible sheets 27d and 28d may be identical with the peripheral portions 32 of FIGS. 1 through 3, being sealed or ultrasonically welded or otherwise secured annularly together in airtight relation, but with a rigid annular hoop 42d being provided within the interior of the inflation chamber 29d between flexible walls 27d and 28d in lieu of the clamping rings 42 of FIG. 3. This hoop 42d need not to be connected to the flexible walls 27d and 28d, but can be held in fixed position therein by reception within the merging peripheral portions of those walls, and upon inflation of the flexible bag ring 42d prevents constriction of the peripheral portions of the walls radially inwardly toward the axis of the device.

Figure 8:
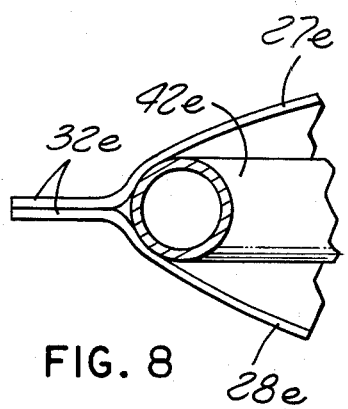

In FIG. 8, the flexible inflatable wall structure is constructed the same as in FIGS. 1 and 7, except that the ring 42e for retaining the peripheral portions 32e of flexible walls 27e and 28e against constriction upon inflation of the device takes the form of an annular inflated ring rather than the rigid rings 42, 42a, 42b, 42c and 42d of the FIGS. 1 to 7 forms. The tubular material of which annular element 42e is formed may be stiffer than the material of which walls 27e and 28e are formed, and may be essentially inextensible to effectively maintain a fixed diameter with respect to axis 30 of the device when ring 42e is inflated. As in the case of FIG. 7, this ring may fit between the merging portions of walls 27e and 28e just radially inwardly of the peripheral portions 32e.

Figure 9:
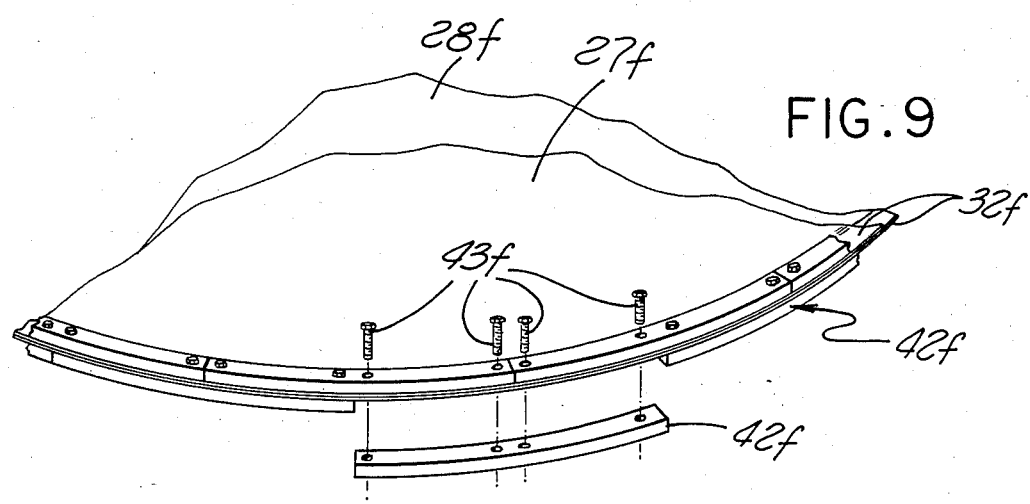
FIG. 9 is a fragmentary exploded perspective view of a variational device.

In FIG. 9, the rigid ring structure 42f is formed of a series of arcuate segments between which the peripheral portions 32f of flexible walls 27f and 28f are clamped. A first series of such sections 42f are provided at the upper side of the peripheral portions of the flexible sheets, extending entirely about their periphery, and a second series of such arcuate sections 42f are provided at the underside of the peripheral portions of the flexible sheets, again extending about the entire circular extent of their peripheries, but with each segment at the underside of the flexible sheets preferably being positioned to overlap opposite ends of two of the segments at the upper side of the sheets, and with each of the arcuate elements at the upper sides of the sheets similarly overlapping the ends of two of the elements at the underside of the sheets. These various segments at the top and bottom of the sheet are clamped together by bolts 43f, to closely retain and confine the peripheral portions of the flexible sheets in a manner forming an annular seal therebetween. This seal may be augmented by ultrasonically welding the peripheries together about their annular extents, or by heat sealing or otherwise adhering them together.

Figure 10:
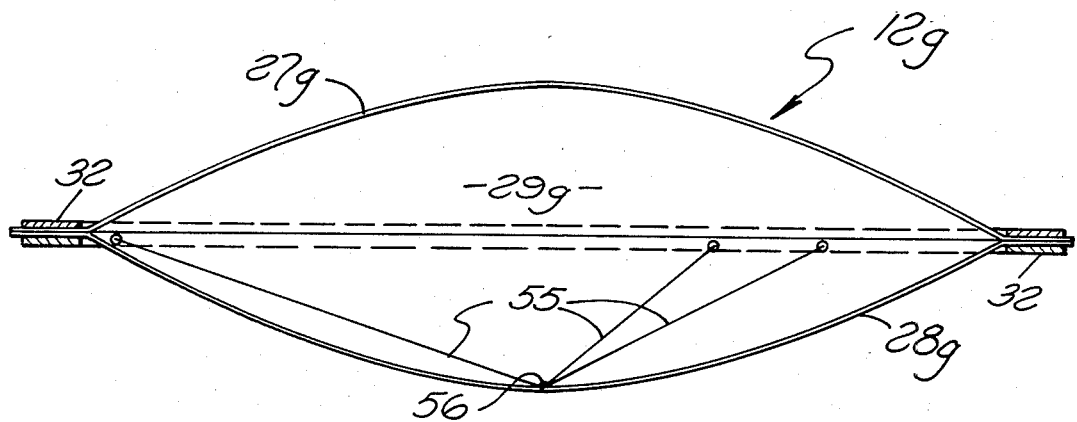
FIG. 10 is an axial section through another variational form.

FIG. 10 shows another form of the invention, which may be the same as that of FIGS. 1 through 3 except as to the manner of determinining when the flexible structure 12g corresponding to inflatable bag 12 of FIG. 1 has been expanded to a condition in which its lower wall 28g is shaped to the form of a paraboloid having its focus at a desired point. In lieu of the automatic sensor 36 and related parts of FIG. 1, the FIG. 10 device may include a series of flexible inextensible cords 55, typically three such cords, located within the interior of the inflatable chamber 29g and each connected at a first end 56 to a central portion of the bottom wall 28g of the inflatable bag, and at its opposite end to the rigid peripheral structure formed by rings 32. These three cords 55 may be connected to the rigid peripheral structure at evenly circularly spaced locations, and be of a length to become taut when bottom wall 28g has reached its desired fully inflated paraboloidal shape. An operator can view these cords visually through the upper transparent wall 27g, and terminate inflation of the flexible bag when the cords become taut.

FIG. 11 shows a form of the invention in which the circular flexible wall 28h corresponding to the reflective wall 28 of the first form of the invention and the similar reflective walls of the other forms of the invention constitutes an upper or forward wall of a vacuum chamber 29h rather than the rear wall of an inflation chamber into which air at superatmospheric pressure is filled. This wall 28h has a reflective surface 39h which faces upwardly and can specularly reflect electromagnetic radiation advancing downwardly from a satellite such as that represented at 11 in FIG. 1, with that radiation extending downwardly parallel to an axis 30h corresponding to the axis 30 of FIG. 1. The reflective surface 39h is shaped to assume the configuration of a paraboloid having its focus at 40h, with a feedhorn 13h being located to receive and utilize radiation reflected to the focus point. In FIG. 11, the incoming parallel radiation is represented at 14h, and the paths that the reflected light follows to focus 40h are represented at 48h.

The peripheral portion 32h of flexible wall 28h is retained against inward constriction toward axis 30h by extension about the outside of a rigid tubular ring 42h, retained by a clamping band 142h adapted to be tightened about the axially turned peripheral portion 32h of the flexible wall and clamp that portion radially between elements 42h and 142h. The band 142h thus maintains an effective annular seal between the periphery of the flexible wall and ring 42h. A lower wall 27h of the vacuum chamber 29h may be either rigid or flexible, but in FIG. 11 is typically illustrated as a rigid horizontal wall attached at its periphery to vertical ring 42h, and forming with that ring and wall 28h a sealed inner chamber 29h within which a subatmospheric pressure is maintained by vacuum pump 35h communicating with chamber 29h through a line 34h.

The feedhorn 13h is supported at focus 40h in any appropriate manner, as by three evenly circularly spaced support rods or arms 47h connected at opposite ends to ring 42h and the feedhorn and forming a tripod structure. The entire assembly may be supported in any convenient manner, as by a support stand or column 16 resting on the earth or a base structure, and in a position in which axis 30h is directed toward the satellite from which a broadcast is to be received.

The reflective flexible wall 28h is given a thickness and formed of a material which under a predetermined pressure differential between the atmospheric pressure at its upper side and subatmospheric pressure at its underside will assume the shapeof a paraboloid having its focus at 40h, so long as the periphery of the flexible wall is retained against inward constriction or other deformation by attachment to ring 42h as discussed. Automatic means may be provided for indicating when the proper vacuum has been attained in chamber 29h to deflect wall 28h to the desired paraboloidal shape, as by provision of a sensor corresponding to that illustrated at 36 in FIG. 1, or by provision of cords such as those illustrated in 55 in FIG. 10, or by other means. In the particular arrangement illustrated in FIG. 11, this purpose is attained by providing a pressure sensor 36h which communicates with the interior of chamber 29h through a line 60, and which is also subjected to atmospheric pressure through an opening 61, and which acts to regulate a vacuum pump 35h and electrically operated air inlet valve 23h in a manner maintaining a predetermined pressure differential between the ambient atmospheric pressure and the subatmospheric pressure in chamber 29h. If by leakage or otherwise the vacuum within chamber 29h is partially lost, and the pressure in that chamber rises above the desired optimum value relative to the external pressure, unit 36h responds to that change in differential pressure to cause an automatic control 62 to place vacuum pump 35h in operation until the desired difference is attained. Conversely, if the internal pressure is too low relative to the external pressure, unit 62 responds by automatically opening valve 23h to admit air in a proper quantity from the outside of the chamber to its interior. Thus, the reflective wall 28h is automatically and continuously maintained in a paraboloidal configuration in which it properly reflects the incoming parallel radiation to focus 40h and produces a signal of maximum intensity from feedhorn 13h to low noise amplifier 46h, circuit 15h and the television set 115h.

The variational arrangement illustrated in FIG. 12 may be considered as essentially identical to that of FIG. 11 except that there has been substituted for the rigid bottom wall 27h of FIG. 11 a flexible bottom wall 27i whose peripheral portion 32i is clamped against a lower extension of ring 42i by a retaining band 142i. The upper reflective wall 28i corresponds to wall 28h of FIG. 11, and is retained by a second band 142i clamping the periphery of wall 28i to the upper portion of the ring 42i. The elements 47i for mounting the feedhorn at a location on axis 30i may be connected to ring 42i at a location between the two bands 142i and between the peripheries of the two walls 27i and 28i. A vacuum pump 35i and air inlet valve 23i, under the control of a pressure sensor 36i and an automatic control element 62i may maintain a predetermined pressure differential between the interior of vacuum chamber 29i and its exterior to cause the upper reflective wall to always have a proper paraboloidal shape for effectively concentrating the radiation at a feedhorn 13i located at the focus 40i of the paraboloid.

FIG. 13 shows an automatic control system which may be utilized in connection with the arrangement of FIGS. 1 through 3, or any of the other arrangements, for actuating feedhorn 13j upwardly and downwardly along the axis 30j of the apparatus (corresponding to axis 30 of FIG. 1) to adjust the position of the feedhorn in correspondence with changes in the position of focus 40j of the paraboloidal reflector resulting from changes in the differential pressure between opposite sides of the reflective wall. For this purpose, the rod or rods 47j which mount the feedhorn to a rigid ring at the periphery of the flexible walls may carry a pinion gear 63 actuable by a crank handle 64 and engaging a rack 65 extending along the outside of feedhorn 13j, with the feedhorn being guided for only upward and downward movement along axis 30j relative to support structure 47j by a bearing ring 66 thereabout. Thus, by rotation of pinion 63, the feedhorn may be actuated upwardly and downwardly along axis 30j to the optimum position relative to focus 40j. In addition to or in lieu of the manual actuating handle or crank 64 for pinion 63, this pinion may be driven by a motor 67 through a drive represented at 68, with the operation of this motor being controlled by an automatic control unit 69 responsive to a signal delivered to it through a line represented at 70 leading from the low noise amplifier 46j corresponding to amplifier 46 of FIG. 1. As in FIG. 1, this amplifier receives an output signal from horn 13j, and delivers a signal to circuit 15j and television receiver 115j. The signal delivered to control unit 69 through line 70 is proportional to the intensity of the radiation received by the feedhorn and causes motor 67 to automatically actuate feedhorn 13j to a position in which its output signal is a maximum. More particularly, if the curvature of the reflective wall (e.g. 28 in FIG. 1) changes, as a result of a change in pressure conditions, the wall remains at all times truly paraboloidal in shape but with its focus shifting to different points along axis 30 as the paraboloid becomes either flatter or more abruptly curved. The automatic control causes the feedhorn to follow such movements of the focus and always be located at the focus of the paraboloid defined by the reflective wall.

While it has not been reitereated specifically in discussing each of the various forms of the invention, it will of course be understood that in each form, the rigid or essentially rigid structure 42, 42a, 42b, 42c, 42d, 42e, 42f, 42g, 42h or 42i serves the function of restraining the peripheral portions of the corresponding flexible walls 27, 28, 27a, 28a, etc. against inward constriction when the device is inflated (or in FIGS. 11 and 12 evacuated), to assure curvature of each of the flexible reflective walls to a truly paraboloidal configuration.

In describing each of the forms of the invention, it has thus far been assumed that the flexible walls 27, 28, 27a, 28a, etc. are initially formed of flat material which is stretched to the paraboloidal shape by inflation or evacuation. It is contemplated, however, that these walls may alternatively be initially molded or otherwise preformed to a normally paraboloidal shape before the device is inflated or subjected to vacuum. For example, the wall 28h of FIG. 11 may be pre-molded to the shape illustrated in that figure before connection to ring 42h and the other parts. The rigid ring 42h will then serve the function of restraining radial constriction of the flexible wall and maintaining its paraboloidal shape when subjected to a vacuum. Similarly, the inflatable bag devices of FIGS. 1 to 10 may have their upper and lower walls premolded to a paraboloidal shape such as that illustrated in FIG. 3.

While certain specific emodiments of the present invention have been disclosed as typical, the invention is of course not limited to these particular forms, but rather is applicable broadly to all such variations as fall within the scope of the appended claims.

I claim:

1. A collector for receiving radiation from a source, comprising:
means forming a chamber within which a pressure different than that at the outside of the chamber may be maintained and having an essentially circular wall of flexible sheet material which is curved by said differential pressure generally circularly about an axis and concavely with respect to said source and reflects radiation from said source generally toward said axis;
said means including an essentially rigid structure extending essentially circularly about said axis and essentially along the periphery of said circular flexible wall and which restrains said periphery of the wall against constriction inwardly toward said axis by said differential pressure as far as the periphery would constrict in the absence of said structure, and which thereby constrains said wall to assume a shape more closely approaching that of a paraboloid than if said structure were not present;
said structure including elements received at opposite sides of said periphery of said wall and between which said periphery is clamped to rigidly fix the diameter of said periphery of the wall while not restraining flexure of other portions of the wall; and
means for receiving radiation concentrated essentially at said axis by said reflective wall.

2. A collector as recited in claim 1, in which said means forming said chamber include a second flexible wall having a perpheral portion also clamped between said elements and retained thereby against constriction radially inwardly.

3. A collector as recited in claim 2, in which said peripheral portion of said first mentioned wall is sealed annularly to said periphery of said second wall.

4. A collector as recited in claim 2, in which said elements include a series of arcuate elements at each side of said periphery of the said first mentioned wall and peripheral portion of said second wall, with the arcuate elements at one side overlapping circularly and being secured to the elements at the opposite side to form together said essentially rigid structure retaining the periphery of said first mentioned wall and peripheral portion of said second wall against constriction.

5. A collector as recited in claim 3, in which said means include circularly spaced fasteners tightening said elements together with said periphery of said first mentioned wall and said peripheral portion of said second wall therebetween.

6. A collector as recited in claim 1, in which said flexbile wall is a front wall of said chamber with said chamber being at a rear side of said wall away from said source and containing a sub-atmospheric pressure.

7. A collector as recited in claim 1, in which said means forming said chamber include a second flexible wall defining the back of said chamber and connected peripherally to at least one of said elements.

8. A collector as recited in claim 6, in which one of said elements is annular, with said periphery of said flexible wall extending circularly thereabout, the other of said elements being an essentially annular clamp disposed about said periphery of said flexible wall and clamping it radially inwardly toward said one element.

9. A collector as recited in claim 1, in which said reflective flexible wall is a rear wall of said chamber, said means including a forward wall of said chamber through which said radiation passes in advancing toward said rear wall, said elements including two annular rings at front and rear sides respectively of said periphery of said rear wall and a peripheral portion of said forward wall and between which said periphery and peripheral portion are clamped axially.

10. A collector as recited in claim 1, in which one of said elements is rigid and extends essentially annularly about said axis, said flexible wall being a forward wall of said chamber at a side of the chamber facing toward said source, said means including a second rear flexible wall at the rear side of said chamber connected peripherally to said one element, a second of said elements extending annularly about said one element and clamping said periphery of said forward wall radially inwardly against said one element, said chamber containing a subatmospheric pressure causing said two flexbile walls to curve axially toward one another.

11. A collector for receiving radiation from a source, comprising:
means forming a chamber within which a pressure different than that at the outside of the chamber may be maintained;
said chamber having an essentially circular wall of flexible sheet material centered about an axis and exposed at one side to the pressure within said chamber and at the other side to the pressure at the outside of the chamber and which is curved by the pressure differential generally circularly about said axis and concavely with respect to said source;
said flexible wall being reflective and acting to reflect radiation from said source generally toward said axis;
means for receiving radiation concentrated at said axis by said reflective wall; and
means for automatically regulating the pressure within said chamber to maintain a predetermined concave shape of said flexible circular wall concentrating the radiation at said axis.

12. A collector as recited in claim 11, in which said regulating means include a pump connected to said chamber, and automatic control means responsive to pressure variations to control said pump in a manner compensating for said variations.

13. A collector as recited in claim 12, in which said control means are also responsive to pressure variations to controllably permit the flow of air between the interior and exterior of said chamber in a direction the reverse of that produced by said pump.

14. A collector as recited in claim 11, in which said regulating means include a sensor responsive to deflection of said wall from a predetermined optimum position, and a pump automatically controlled by said sensor to regulate the pressure within said chamber in a manner compensating for such deflection of the wall from said predetermined position.

15. A collector for receiving radiation from a source, comprising:
means forming a chamber within which a pressure different than that at the outside of the chamber may be maintained and having an essentially circular wall of flexible sheet material which is curved by said differential pressure generally circularly about an axis and concavely with respect to said source and reflects radiation from said source generally toward said axis;
a unit positioned essentially on said axis and adapted to receive and respond to the reflected radiation; and automatic control means responsive to variations in the amount of reflected radiation received by said unit to automatically shift said unit and said flexible reflective wall axially relative to one another in a relation maximizing the amount of radiation received by said unit.

16. A collector as recited in claim 15, in which said automatic control means include motor means for shifting said unit relative to said flexible wall to different positions along said axis, and means for sensing the output from said unit and automatically actuating said motor means to move the unit to a position in which said output is maximized.

17. A collector for receiving radiation from a source, comprising:
means forming a chamber within which a pressure different than that at the outside of the chamber may be maintained;
said chamber having an essentially circular wall of flexible sheet material exposed at one side to the pressure within said chamber and at the other side to the pressure at the outside of the chamber and which is curved by the pressure differential generally circularly about said axis and concavely with respect to said source;
said flexible wall being reflective and acting to reflect radiation from said source generally toward said axis;
means for receiving radiation concentrated at said axis by said reflective wall;
a sensor responsive to deflection of said wall to a predetermined optimum curvature; and
means controlled by said sensor to automatically regulate said pressure differential to a value maintaining said flexible wall at said optimum curvature.

18. A collector as recited in claim 17, in which said sensor is positioned for actuation by an essentially central portion of said flexible wall when the wall is essentially at said optimum curvature.

19. A collector as recited in claim 17, in which said sensor includes a switch located for actuation by said flexible wall when the latter has essentially said optimum curvature.

20. A collector as recited in claim 17, in which said means controlled by said sensor include a pump connected to said chamber, and controlled by said sensor to regulate said pressure differential.

21. A collector as recited in claim 17, in which said means controlled by said sensor include a pump connected to said chamber to pump air in a first direction between the interior and exterior of the chamber, valve means for permitting the flow of air between the interior and exterior of said chamber in a direction the reverse of that produced by said pump, and automatic control means controlled by said sensor to automatically regulate said pump and said valve means in a relation regulating said pressure differential to maintain said flexible wall at said optimum curvature.

22. A collector for receiving radiation from a source, comprising:
means forming a chamber within which a pressure different than that at the outside of the chamber may be maintained;
said chamber having an essentially circular wall of flexible sheet material exposed at one side to the pressure within said chamber and at the other side to the pressure at the outside of the chamber and which is curved by the pressure differential generally circularly about said axis and concavely with respect to said source;
said flexible wall being reflective and acting to reflect radiation from said source generally toward said axis;
means for receiving radiation concentrated at said axis by said reflective wall;
a differential pressure reponsive unit subjected to the pressure at opposite sides of said flexible wall; and
means controlled by said unit to automatically maintain a predetermined pressure differential between said opposite sides of said flexible wall and to thereby maintain said wall at a predetermined optimum curvature.

23. A collector as recited in claim 22, in which said means include a pump connected to said chamber, and automatic control means responsive to a change in said pressure differential between opposite sides of said flexible wall to actuate the pump in a manner automatically maintaining essentially said predetermined pressure differential.

24. A collector as recited in claim 22, in which said means include a pump connected to said chamber and operable to pump air in a predetermined direction between the interior and exterior of the chamber, valve means for permitting the flow of air between the interior and exterior of said chamber in a direction the reverse of that produced by said pump, and means for automatically actuating said pump and said valve means in accordance with the differential pressure sensed by said unit to automatically maintain essentially said predetermined pressure differential between opposite sides of the flexible wall.

25. A collector for receiving radiation from a source, comprising:
means forming a chamber within which a pressure different than that at the outside of the chamber may be maintained and having an essentially circular wall of flexible sheet material which is curved by said differential pressure generally circularly about an axis and concavely with respect to said source and reflects radiation from said source generally toward said axis; and
means for receiving radiation concentrated at essentially said axis by said reflective wall;
said means forming said chamber including an essentially rigid structure extending essentially circularly about said axis and secured to the periphery of said flexible wall and restraining it rigidly against even slight radially inward constriction toward said axis by said differential pressure.

* * * * *